INVENTORS.
ANTHONY E. COCOROS
RUSSELL L. MATHIAS

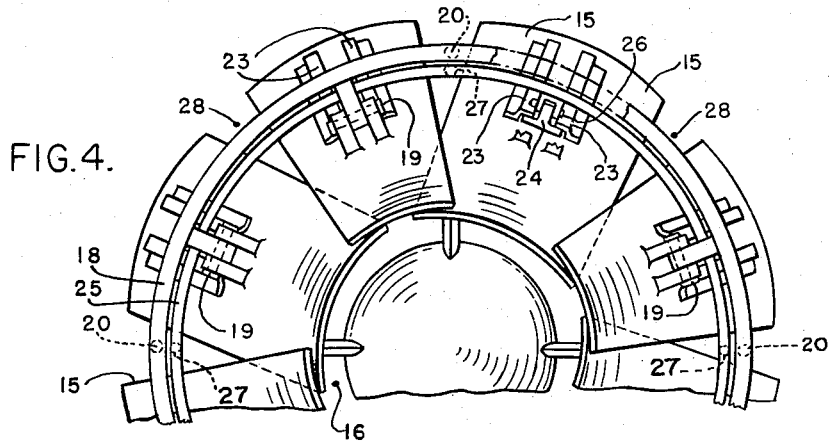
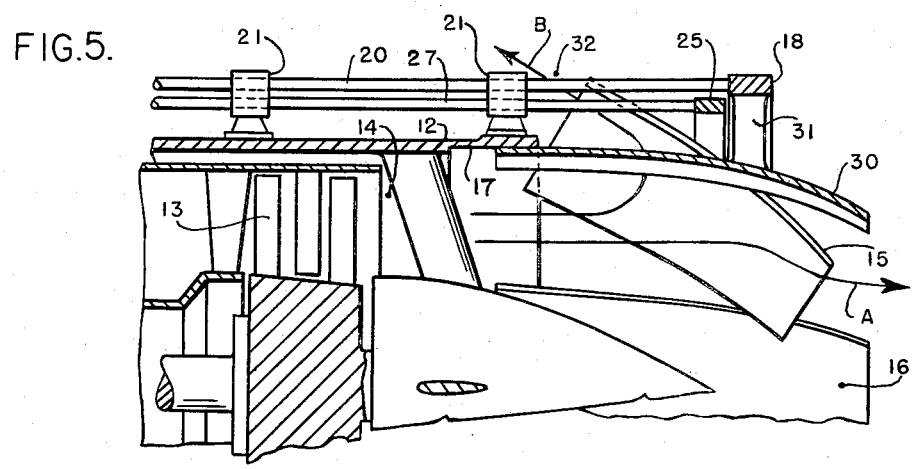
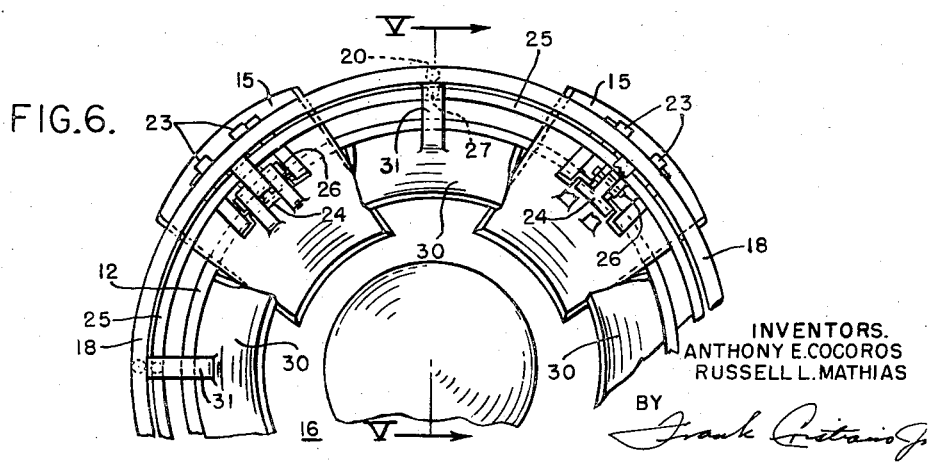

United States Patent Office 2,970,432
Patented Feb. 7, 1961

2,970,432

JET ENGINE THRUST REVERSING NOZZLE

Anthony E. Cocoros, Prairie Village, Kans., and Russell L. Mathias, Pittsburgh, Pa., assignors to Westinghouse Electric Corporation, East Pittsburgh, Pa., a corporation of Pennsylvania Filed Jan. 22, 1958, Ser. No. 710,518

5 Claims. (Cl. 60—35.54)

This invention relates to exhaust nozzle structure, more particularly to exhaust nozzle structure for jet propulsion engines, and it has for an object to provide an improved exhaust nozzle structure that controls the direction of thrust.

In the jet propulsion engine art, the desirability of controlling the direction of thrust of the engine is well known and numerous devices have heretofore been proposed for destroying forward thrust and for reversing the thrust when required. Such devices facilitate landing of jet propelled aircraft by reducing the landing speed of such craft and also rapidly reducing the speed of the craft after landing, thereby rendering feasible employment of shorter runways.

It is a further object of the invention to provide an improved device of the above character which is simple in structure, yet of rugged character and of high reliability.

Briefly, in accordance with the invention, there is provided an exhaust nozzle structure comprising an annular array of leaves pivotally connected to an annular actuating member and defining a rearwardly directed outlet for hot gases from the engine. The forward end portions of the leaves are normally restrained against rotation by the engine shell, but are movable rearwardly out of engagement therewith by the actuating member. The leaves are further pivotally connected to a second annular actuating member by slidable elements, so that they may be rotated radially outwardly to provide laterally disposed gas outlets.

When it is desired to reduce the forward thrust, the leaves are first disengaged from the shell by the first actuating member. These second actuating member is then actuated to slide the slidable elements rearwardly, thereby permitting the leaves to rotate through an angle of about 45°. In the rotated position, the cross-sectional area of the rearwardly directed outlet is reduced and a laterally disposed annular outlet is formed between the leaves and the engine shell for directing a portion of the gases in a substantially radially outward and forward direction, thus providing a rearward thrust opposing the forward thrust of the engine.

If desired, some of the leaves may be non-rotatably arranged, as illustrated in a modification of the invention, for reasons subsequently to be described.

The foregoing and other objects are effected by the invention as will be apparent from the following description and claims taken in connection with the accompanying drawings, forming a part of this application, in which:

Fig. 4 is a fragmentary rear end view showing the exhaust nozzle in the position illustrated in Fig. 2;

Fig. 5 is an axial sectional view similar to Fig. 2 but illustrating a second embodiment of the invention; and Fig. 6 is a fragmentary rear end view of the exhaust nozzle shown in Fig. 5.

Figure 1:
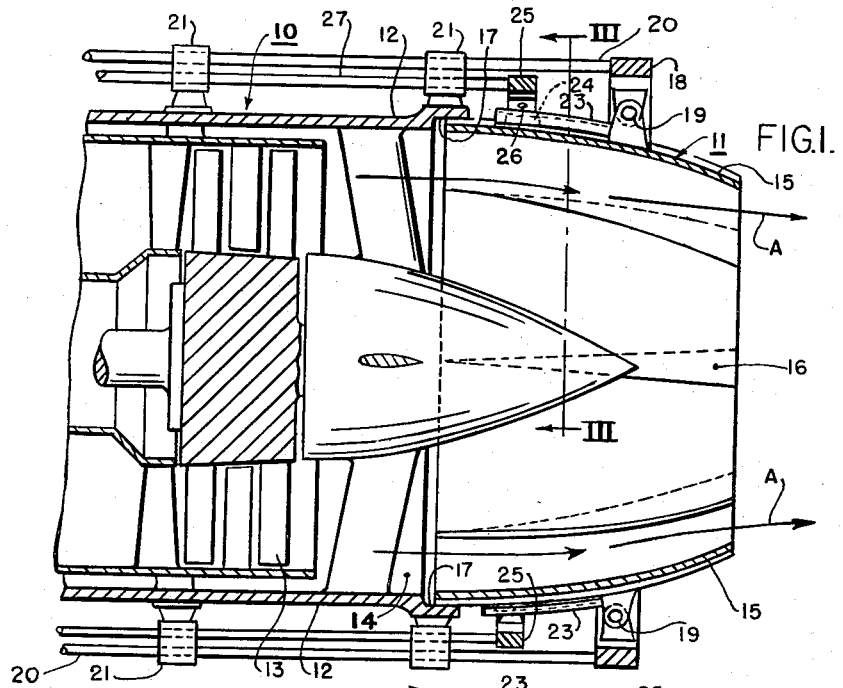
Fig. 1 is a fragmentary axial sectional view of the aft end of an aviation jet engine having an exhaust nozzle structure formed in accordance with the invention, the nozzle being shown in the forward thrust or normal operating position.

Referring to the drawings in detail, especially Figs. 1–4 inclusive, there is shown the aft or rear end of an aviation jet propulsion engine 10 having an exhaust nozzle structure 11 formed in accordance with the invention. Since the aviation jet engine 10 may be of any desirable type and forms no part of the invention, it has not been fully shown and will be described only in so far as essential for comprehension of the invention.

The engine 10, as illustrated, is of the turbojet type and is provided with a cylindrical outer shell 12, within which are disposed the usual engine components including fuel combustion apparatus and a gas turbine 13. The outer shell 12 further forms a passageway 14 for directing the flow of gases expanded in the turbine 13 through the nozzle structure 11 to atmosphere, to provide a forward propulsive thrust to the engine, as well known in the art.

The exhaust nozzle structure 11 has an annular array of leaves or segments 15 which are disposed in alignment with the outer periphery of the engine shell 12 and form a circular rearwardly directed exhaust outlet 16 at their aft ends for directing the gases to the atmosphere in a smooth jet. The forward ends of the leaves are disposed in lapping relation with the rear peripheral marginal portion 17 of the engine shell 12 and are thereby restrained against outward movement due to the internal gas load imposed thereon when the engine is in normal operation. This marginal portion 17 is preferably offset radially outwardly so that the interior wall surfaces of the leaves are disposed in alignment with the inner wall surface of the shell 12. The leaves 15 are rotatably attached, for joint actuation, to an annular common actuator or unison ring 18 disposed in encompassing relation with the leaves and are pivotally connected thereto intermediate their ends by pivot pins 19. The unison ring 18 is movable in fore and aft direction parallel to the axis of the shell 12 by a plurality of push rods 20 connected to suitable reciprocable power actuators (not shown) and the rods are slidably held on the shell 12 by stationary guides 21.

The leaves 15 are further provided with tracks or guides 23 which slidably support brackets 24. The guides 23 are mounted in a central position on the outer surfaces of the leaves 15 and extend forwardly of the pins 19, and the brackets 24 are connected, for joint actuation, to a second annular actuator or unison ring 25 by pivot pins 26. The unison ring 25 is connected by push rods 27 to a second set of reciprocable power actuators (not shown) for movement in fore and aft direction.

The leaves 15 may be of any suitable arcuate shape in longitudinal section, as shown in Fig. 1, to impart a convergent shape to the nozzle and, if desired, may be disposed in mutually lapping relation with each other to provide a seal against leakage of gas flow therethrough when the leaves are in the normal or rearwardly exhausting position shown in Fig. 1.

When it is desired to operate the engine 10 in the normal manner, i.e. to provide forward thrust, the exhaust nozzle structure 11 is positioned as shown in Fig. 1 and the gases formed in the engine are ejected therethrough in rearward direction, as indicated by the arrows A, to provide a forward thrust to the engine. However, when it is desired to reduce the thrust, for example when it is desired to land the aircraft, the unison ring 18 is moved in rearward direction by the push rods 20, thereby moving the leaves 15 rearwardly and out of lapping engagement with the marginal shell portion 17. Immediately subsequent thereto, the unison ring 25 is moved in rearward direction by the push rods 27 to slide the brackets 24 in the guides toward the pivot pins 19, reducing the spacing between the pivot pins 26 and 19 and permitting the leaves 15 to rotate about the pivot pins to the extreme convergent position shown in Fig. 2. In this position, the exhaust gas outlet 16 is reduced in area while a substantially annular lateral outlet 28 is provided by the forward and side edges of the leaves 15 and the rearward edge of the marginal shell portion 17. Hence, the flow which heretofore had been directed entirely through the outlet 16 is now divided and a considerable portion of the flow is directed through the lateral outlet 28, as indicated by the arrows B, in a direction transverse to the direction of the gas flow A and having a forwardly directed vector component opposing the forward thrust of the gases ejected through the outlet 16, so that the aircraft's forward speed may be arrested in a shorter interval of time.

When it is desired to again move the exhaust nozzle 11 to its normal position the sequence of operations outlined above is reversed.

Figure 2:
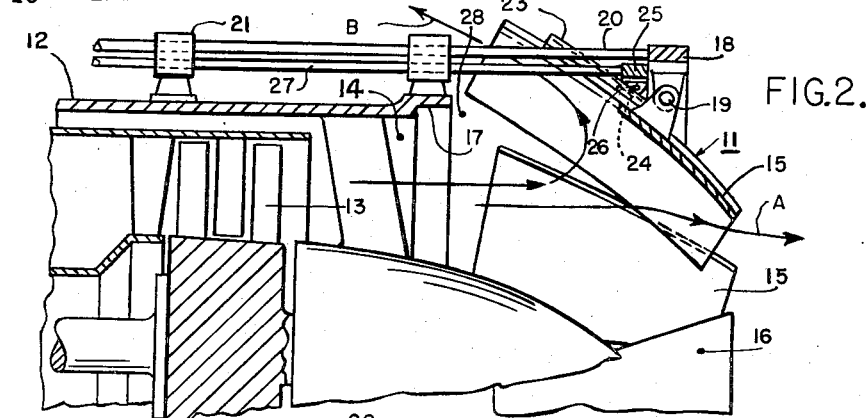
Fig. 2 is a fragmentary sectional view similar to that shown in Fig. 1, but illustrating the nozzle in a second or thrust reversing position.
Figure 3:
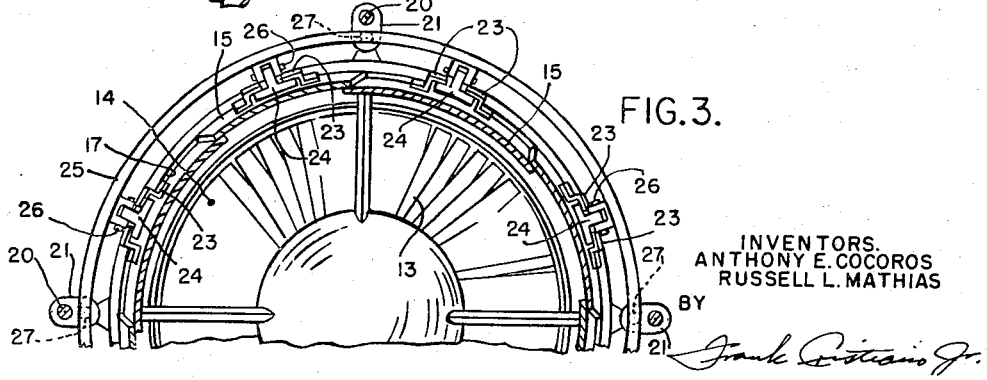
Fig. 3 is a fragmentary sectional view taken on line III—III of Fig. 1 and looking in the direction indicated by the arrows.

Although the leaves are disposed in mutually lapping relation with each other when the nozzle is in the position shown in Fig. 1, rotation of the leaves to the thrust reversing position shown in Fig. 2 causes them to diverge from each other at their forward end portions, thereby permitting the leaves to move freely without interference by each other. Also, as best shown in Fig. 4, as the leaves are rotated outwardly, the side edges of the leaves are adequately separated from each other. Hence, even though the forward end portions of the leaves extend radially outwardly beyond the push rods 20 and 27, movement of the rods is attained without interference.

Referring to Figs. 5 and 6, there is shown a second embodiment of the invention. In this embodiment, some of the leaves 15 are pivotally attached to the unison ring 18 in the same manner described in conjunction with the first embodiment. However, a plurality of leaves 30 are further provided which are longer than the other leaves 15 so that as the unison ring 18 is moved rearwardly the leaves 15 are disengaged from the shell portion 17 and are rotated outwardly in the same manner as outlined in connection with the first embodiment, while the leaves 30 are maintained in lapping relation with the shell portion 17 and thus restrained against rotation. Although the leaves 30 are restrained against rotation by the shell portion 17, they are preferably rigidly attached to the unison ring 18 by radial struts 31, thereby obviating connection to the second unison ring 25. Hence, with this arrangement a plurality of side outlets 32 are formed corresponding to the annular or continuous outlet 28 of the first embodiment but of smaller total area than the latter. In a similar manner, the rearward outlet 16 is reduced in area a smaller amount than in the first embodiment.

This arrangement may be highly desirable for application wherein a larger degree of forward thrust is essential for maneuvering the aircraft while landing. Also, in this embodiment the leaves 30 may be arranged in such a manner that overheating of vital aircraft areas adjacent thereto by the ejected gases may be avoided.

It will now be seen that the invention provides an exhaust nozzle structure of the thrust reversing type which is simple to operate, reliable in operation and adequate to permit landing of aircraft on short runways. It will further be seen that the invention provides an exhaust nozzle structure which may be moved from one position to the other by simple mechanism disposed outside of the engine shell and leaf array so that overheating of the mechanism is minimized.

It will further be seen that the invention provides an exhaust nozzle structure which may be modified to suit the application in a simple manner, and that all or only some of the leaves may be rotatably mounted, and that the peripheral location of the rigid leaves may be selected as desired without complicating the device.

While the invention has been shown in several forms, it will be obvious to those skilled in the art that it is not so limited, but is susceptible of various other changes and modifications without departing from the spirit thereof.

What is claimed is:

1. An exhaust nozzle structure for a jet propulsion engine including a tubular shell structure defining the outer periphery of an exhaust gas passageway, an annular array of mutually lapping segments disposed downstream of said shell structure in the direction of gas flow and defining the outer periphery of a rearwardly directed gas outlet, common actuating means for jointly translating said leaf segments in a direction parallel to the axis of said shell structure, said common actuating means including a unison ring carrying said leaf segments and disposed in encompassing relation therewith, said shell structure having a rear radially outwardly offset marginal portion having an inner circular surface and at least one of said leaf segments being movable into and out of registry with said inner surface by said common actuating means, means pivotally connecting said one leaf segment to said common actuating means, and second actuating means for rotating said one leaf segment about said pivotal connecting means when said one leaf segment is disposed out of lapping relation with the inner surface of said marginal wall portion, said one leaf segment having a guide member and a slidably supported bracket mounted thereon, said bracket being disposed forwardly of said pivotal connecting means and operatively connected to said second actuating means.

2. An exhaust nozzle structure for a jet propulsion engine including a tubular shell structure defining the outer periphery of an exhaust gas passageway and having a marginal peripheral portion defining an annular inner surface, an annular array of leaf segments disposed in registry with said peripheral portion and defining the outer periphery of a gas outlet, first common actuating means for jointly translating said leaf segments in a direction parallel to the axis of said shell structure, said first common actuating means including a unison ring carrying said leaf segments and disposed in encompassing relation therewith, said leaf segments being movable into and out of lapping relation with the inner surface of said marginal peripheral portion by said first common actuating means, first means pivotally connecting said leaf segments to said unison ring, second common actuating means, and second means comprising guide members and brackets slidably received therein, said guide members being mounted on said leaf segments and said brackets being pivotally connected to said second common actuating means, said second common actuating means being effective to rotate said leaf segments about said first pivotal means when said leaf segments are disposed out of lapping relation with said marginal peripheral portion.

3. An exhaust nozzle structure for a jet propulsion engine including a tubular shell structure defining the outer periphery of an exhaust gas passageway and having a radially outwardly offset marginal peripheral portion defining an annular inner surface, an annular array of leaf segments disposed in registry with said peripheral portion and defining the outer periphery of a rearwardly directed circular gas outlet, a first unison ring for jointly translating said leaf segments in a direction parallel to the axis of said shell structure, said segments being carried by and pivotally connected to said first unison ring and movable axially into and out of lapping relation with the inner surface of said marginal peripheral portion by said unison ring, a second unison ring disposed forwardly of said first unison ring, means pivotally connecting said leaf segments to said second unison ring, said last mentioned means including guide members carried by said leaf segments and brackets slidably received in said guide members, said brackets being connected to said second unison ring, said second unison ring being effective to rotate said leaf segments when the latter are disposed out of lapping relation with said marginal peripheral portion, whereby the open area of the rearwardly directed outlet is reduced to an open area of lower value and a laterally disposed opening is formed jointly by said marginal peripheral portion and said leaf segments.

4. An exhaust nozzle structure for a jet propulsion engine including a tubular shell structure defining the outer periphery of an exhaust gas passageway and having a marginal peripheral portion defining an annular inner surface, an annular array of arcuate leaf elements disposed in registry with the inner surface of said peripheral portion and defining the outer periphery of a rearwardly directed convergent outlet for ejecting the gas in a rearwardly directed stream to atmosphere to provide a forward propulsive thrust, first actuating means for jointly translating a plurality of said leaf elements into and out of lapping engagement with said peripheral portion, said first actuating means including a unison ring carrying said leaf elements and disposed in encompassing relation therewith, pivotal means connecting said plurality of leaf elements to said unison ring, and second actuating means for rotating said plurality of leaf elements about said first pivotal means to a position reducing the cross-sectional area of said outlet, to a smaller open area, said plurality of leaf elements and said peripheral portion jointly defining a lateral opening when said leaf elements are in said position, said opening permitting diversion of a portion of the gas to atmosphere in a stream having a forwardly directed vector component opposing the forward thrust of the rearwardly directed gas stream.

5. An exhaust nozzle structure for a jet propulsion engine including a tubular shell structure defining the outer periphery of an exhaust gas passageway and having a marginal peripheral portion defining an inner annular surface, an annular array of mutually lapping leaf elements of arcuate cross sectional shape disposed in registry with said peripheral portion and defining the outer periphery of a rearwardly directed convergent outlet for ejecting the gas to atmosphere to provide a forward propulsive thrust, a first unison ring encompassing said leaf array and jointly translating a plurality of said leaf elements into and out of lapping engagement with said peripheral portion, said first unison ring carrying said leaf elements, pivotal means connecting said plurality of leaf elements to said first unison ring, a second unison ring disposed forwardly of said first unison ring for rotating said plurality of leaf elements about said first pivotal means to a position reducing the cross-sectional area of said outlet, brackets slidably supported by said plurality of leaf elements and pivotally connected to said second unison ring, said plurality of leaf elements and said peripheral portion jointly defining laterally disposed openings when said leaf elements are in said position, said openings permitting diversion of a portion of the gas to atmosphere in a direction transverse to said outlet.

References Cited in the file of this patent

UNITED STATES PATENTS

| | | |
|---|---|---|
| 2,693,078 | Laucher | Nov. 2, 1954 |
| 2,753,684 | Greene | July 10, 1956 |
| 2,778,190 | Bush | Jan. 22, 1957 |
| 2,803,944 | Kroon | Aug. 27, 1957 |
| 2,841,954 | Rainbow | July 8, 1958 |

FOREIGN PATENTS

| | | |
|---|---|---|
| 778,008 | Great Britain | July 3, 1957 |